Dec. 25, 1962 W. S. SAWLE, JR 3,069,915
COUPLING ASSEMBLY FOR ENGINE CRANKSHAFTS
Filed Aug. 4, 1958
2 Sheets-Sheet 1
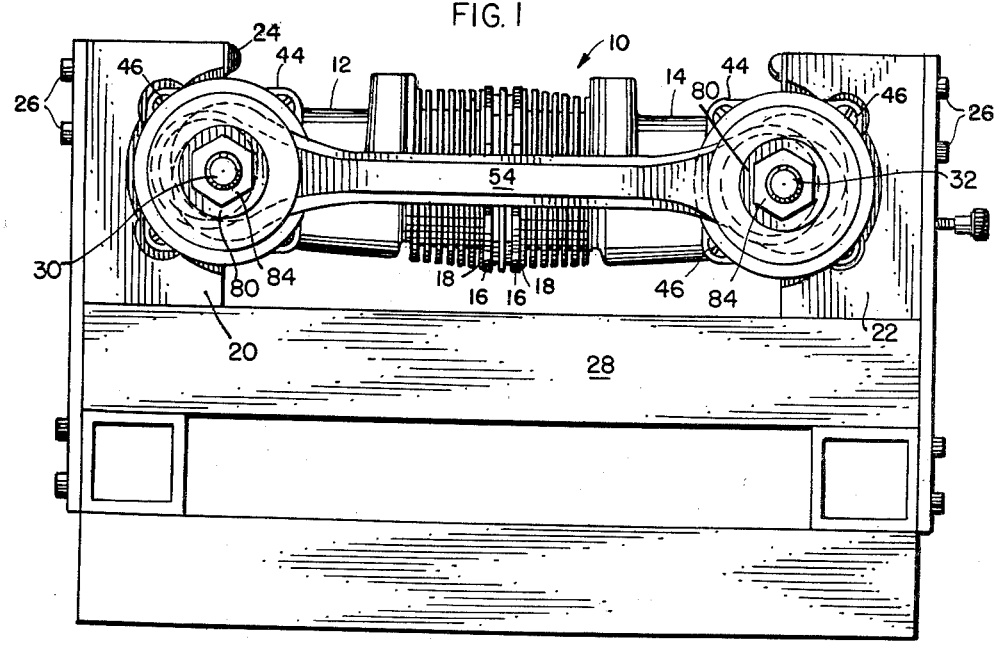
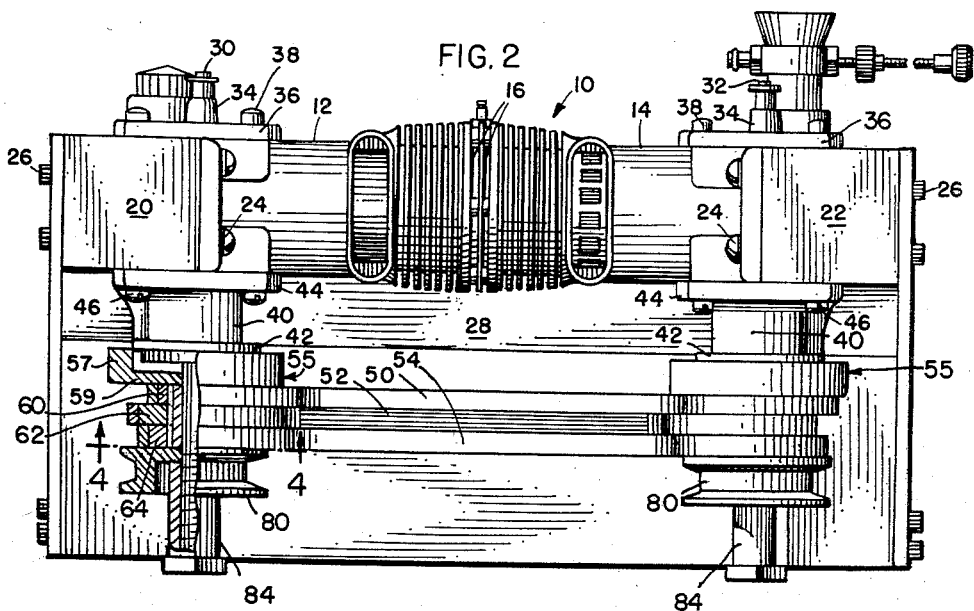
INVENTOR:
WILLIAM S. SAWLE JR.
BY
ATT'Y

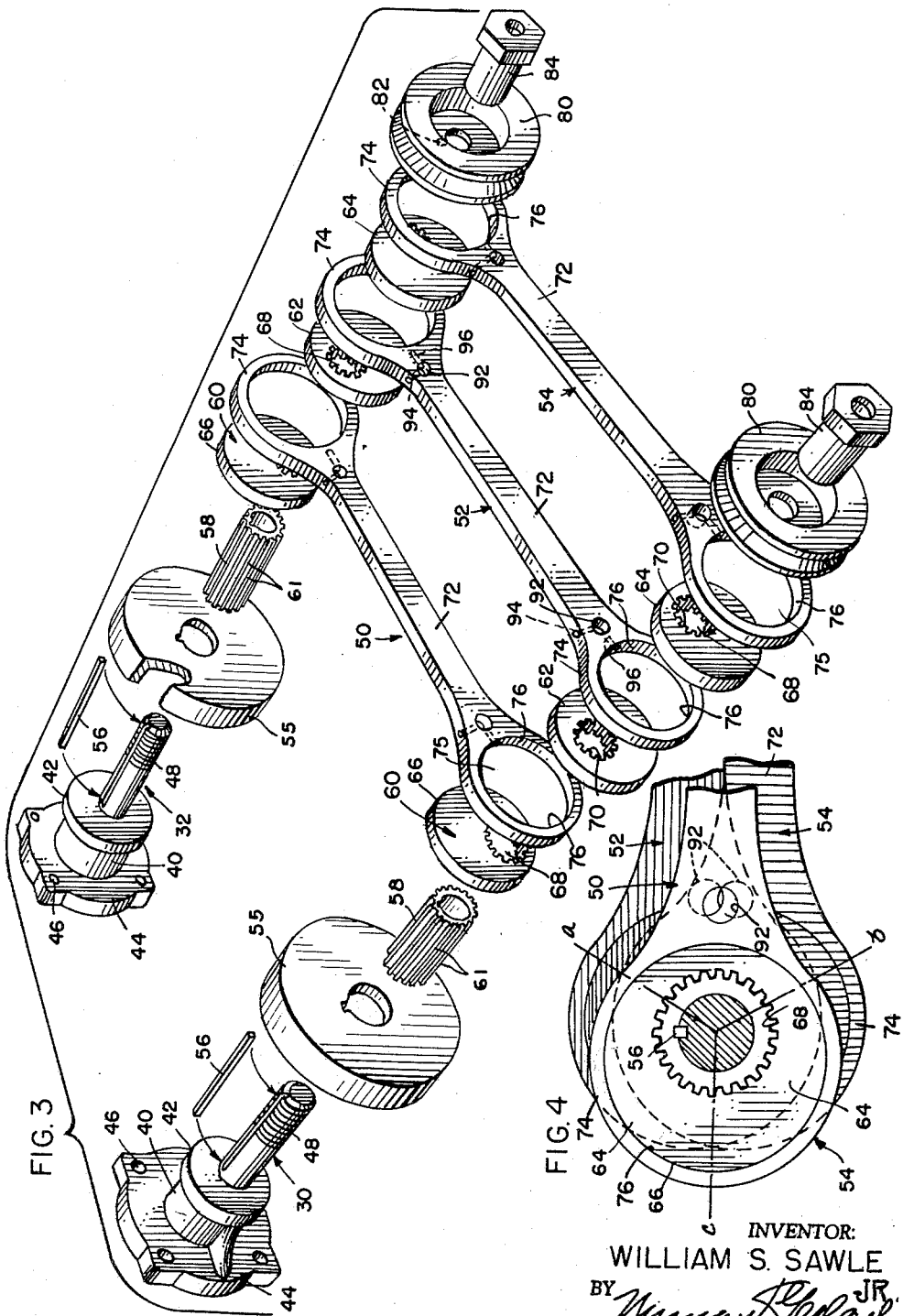

United States Patent Office 3,069,915
Patented Dec. 25, 1962

3,069,915
COUPLING ASSEMBLY FOR ENGINE
CRANKSHAFTS
William S. Sawle, Jr., 151 Sheridan Road,
Kenilworth, Ill.
Filed Aug. 4, 1958, Ser. No. 752,825
1 Claim. (Cl. 74—68)

The improved coupling assembly comprising the present invention has been designed for use primarily in connection with the coupling together of engine crankshafts, particularly the spaced crankshafts of internal combustion engines of the opposed piston type wherein a pair of axially aligned opposed pistons share a common combustion chamber therebetween, wherein the reciprocal movements of the pistons are translated into rotary motion of respective crankshafts, and wherein the rotational movements of the crankshafts must be synchronized for proper valve action. The invention is however capable of other uses and the coupling assembly of the present invention may, if desired, with or without suitable modification, be employed for synchronizing the rotary motion of steam engine crankshafts, or rotary shafts which are associated with a wide variety of machines or mechanisms other than steam or combustion engines. The coupling mechanism of the present invention is not limited in its function to the synchronization of the motion of two rotary members and the same will be found effective as a driving connection or power train wherein the rotary motion of a driving member is applied to a driven member as for example the driving of a camshaft from the engine shaft of an internal combustion or steam engine. Irrespective however of the particular use to which the invention may be put, the essential features thereof are at all times preserved.

The invention has, for illustrative purposes herein, been disclosed in connection with a two-cycle internal combustion engine of the type shown and described in my copending application, Serial No. 590,296, filed June 8, 1956, now Patent No. 2,853,983, for Internal Combustion Engine of the Opposed Piston Type, wherein a pair of rotary crankshafts operatively associated with respective opposed pistons have the movements thereof correlated by means of intervening gearing. The present invention is designed as an improvement over the combustion engine shown and described in such application in that an improved coupling means between the two crankshafts has been employed offering certain advantages over the gearing formerly employed for this purpose.

The use of gearing as a coupling means between adjacent rotary shafts in an internal combustion engine of the type herein described is possessed of numerous limitations, principal among which is lack of strength. In any system of gearing, the overall strength of the system can be no greater than the strength of the weakest gear tooth in the gearing and, thus, casting or machining imperfections in the construction of the individual gears of the system are frequently a cause for failure. Additionally, particularly where the shafts to be coupled are disposed at an appreciable distance from each other, either a large number of gears must be employed, or the diameters of the fewer gears must be relatively great so that the space consumed by the gearing and the weight of the gearing is unduly large. To rotatably support the individual rotary components of the gear system, stationary supporting structure in the form of bearing supports must be provided, thus further contributing toward extreme weight and additional machining or casting operations. Another limitation connected with the use of gearing for shaft-coupling purposes is the matter of wear which frequently leads to lost motion between the parts and ultimate lack of synchronism between the coupled shafts, resulting in poor valve timing. Finally, due to the large and widely separated areas of sliding metal-to-metal contact throughout the power train, lubrication becomes a problem and the noise level is increased.

The present invention is designed to overcome the above noted limitations that are attendant upon the conventional use of gearing as a coupling means between the crankshafts of internal combustion engines and, toward this end, it contemplates the provision of a series of rigid, torque-applying, connecting links which are operatively connected at the opposite ends thereof to the respective crankshafts by means of eccentric bearing sleeves which are integrally formed with the links and which surround and make intimate coextensive face-to-face contact with cooperating cylindrical bearing surfaces provided on the crankshafts, and which bearing surfaces have their axes radially offset from the respective axes of the crankshafts. To minimize the possibility of dead-center thrust on either crankshaft, particularly where a driving and a driven shaft are concerned, plural connecting links are employed and the cylindrical bearing surfaces provided on each crankshaft have their respective axes circumferentially spaced from one another in such a manner that when a dead center or a near dead center condition exists in connection with one of the connecting rods at one end thereof, the other connecting rods in the series will be so positioned that they will be capable of applying a relatively large amount of force or torque to the shaft. The use of plural connecting links has the additional advantage that the overall strength of the coupling system is increased in direct proportion to the number of links employed. Yet another advantage of the present invention resides in the fact that rigid connecting links of the character employed herein are capable of withstanding relatively great compressional and tensional stresses without deformation or rupture so that the combined strength of plural connecting rods, all of which are effective in the system at the same time, affords a degree of resistance to breakage hitherto maintained with conventional gearing.

The provision of a coupling mechanism of the character briefly outlined above being among the principal objects of the invention, a further object is to provide such a mechanism wherein the bearing surfaces on the two shafts are disposed in close proximity to one another so that the connecting links which extend between the opposed bearing surfaces on the two shafts may be disposed in closely nested relationship, thereby consuming but little space.

The provision of a coupling assembly for the crankshafts of internal combustion engines or other rotative members which depends for its torque transmitting action upon the cooperation between sliding cylindrical surfaces which are permanently associated with each other, as distinguished from the separable sliding cooperation between mating tooth surfaces, and which therefore facilitates lubrication thereof; one which is comprised of a minimum number of relatively moving parts and which therefore is unlikely to get out of order; one which is rugged and durable and which therefore will withstand rough usage; one which is capable of being easily assembled and disassembled for purposes of inspection, replacement of parts or repair; one which is comprised of various parts, many of which are identical, so that manufacturing costs are materially reduced; one which is smooth and silent in its operation; one which is attractive in appearance and pleasing in design, and one which otherwise is well adapted to perform the services required of it, are further desirable features which have been borne in mind in the production and development of the present invention.

Numerous other objects and advantages of the invention, not at this time enumerated, will become readily apparent as the following description ensues.

In the accompanying two sheets of drawings forming a part of this specification a preferred embodiment of the invention has been shown.

In these drawings:

FIG. 1 is a side elevational view of an internal combustion engine showing the improved crank shaft coupling means of the present invention operatively applied thereto;

FIG. 2 is a plan view of the internal combustion engine shown in FIG. 1;

FIG. 3 is an enlarged exploded perspective view of the cooperating elements associated with the coupling mechanism of the present invention; and FIG. 4 is an enlarged fragmentary sectional view taken substantially along the line 4—4 of FIG. 2.

Referring now to the drawings in detail and in particular to FIGS. 1 and 2, the invention has been exemplified by its association with an internal combustion engine of the opposed piston type. Such an engine has been shown in my copending application mentioned above. Except insofar as the engine crankshafts are coupled together by the mechanism of the present invention, the details of the internal combustion engine illustrated herein form no part of the invention and reference may be had so such copending application for a full understanding of the engine and its mode of operation. It is deemed sufficient for purposes of disclosure herein to point out that the engine, which has been designated in its entirety at 10, involves in its general organization a pair of contiguous engine blocks or block sections 12 and 14 respectively arranged in end-to-end relationship and axially aligned. The adjacent ends of the two sections 12 and 14 are provided with radial flanges 16 which are secured together by clamping bolts 18. The sections 12 and 14 are operatively connected to respective crankcases 20 and 22 by means of clamping bolts 24 and the crankcases are, in turn, suitably bolted as at 26 to an engine framework which has been designated in its entirety at 28. Only the external aspects of the engine 10 have been illustrated herein and it will be understood that each engine block section 12 and 14 has a piston mounted for reciprocation therein and that each piston is operatively connected to a crankshaft within its respective crankcase by conventional connecting rods, wrist pins and bearing assemblies.

The two crankshafts are designated at 30 and 32 respectively and each crankshaft is rotatably journalled at one end in a bearing support 34 carried by an end closure cap 36 bolted as at 38 to the crankcase body 30 or 32 as the case may be. The other end of each crankshaft is rotatably journalled in a bearing support 40 which is radially flanged as at 42 and which is integrally formed on a closure member 44 bolted as at 46 to its respective crankcase body. This end of the crankshaft projects outwardly an appreciable distance as shown in FIG. 3 beyond the flanged end 42 of the bearing support 40 and has its extreme outer end threaded as at 48 for purposes that will be made clear presently.

In order to synchronize the rotary movements of the two crankshafts 30 and 32 and effect rotation thereof in unison, the present invention provides a plurality of identical connecting links, three such links 50, 52 and 54 respectively, being illustrated herein although a greater or lesser number of such links may be utilized if desired. The connecting links are operatively connected at the opposite ends thereof to the two crankshafts 30 and 32 in such a manner that each link may operate upon, or be operated by, each crankshaft in the manner of an eccentric crank arm so that the rotational movements of either shaft will be translated to the other shaft.

Accordingly, the crankshaft 30 receives thereover a flywheel 55 having a peripheral flange 57 thereon and a thin web portion 59 which bears against the flanged end 42 of the bearing support 40 and which is keyed as at 56 to the crankshaft. Also, telescopically received over the crankshaft and held against rotation thereon by the key 56 is a sleeve 58 having splines 61 thereon and which extends from the outer face of the flywheel 55 to a medial region of the threads 48 on the outer end region of the crankshaft. The splined sleeve 58 receives thereover a plurality of eccentric disk members 60, 62 and 64 respectively, hereinafter referred to as eccentric disks. Although three such eccentric discs have been illustrated herein, it will be understood that a greater or lesser number thereof may be employed if desired. The eccentric disks 60, 62 and 64 are identical and each is in the form of a circular disk presenting a cylindrical bearing surface 66 at its periphery. Each eccentric disk is formed with an opening 68 therethrough presenting internal splines 70 and by means of which the disk may be telescopically received over the sleeve 58 in a selective manner so that the radial direction of eccentricity of the disk may be varied by small increments of angularity, depending upon the number of splines 61 and 70 provided on the sleeve and disk respectively. In FIG. 4, twenty-four spline teeth have been shown on each member but it will be understood that this number may vary within limits and that the number employed will depend upon the particular nature of any given installation. With twenty-four such splines being provided, each eccentric disk may be selectively installed on the sleeve 58 to vary the direction of eccentricity of the disk by increments of 15°. The three eccentric disks 60, 62 and 64 are disposed on the sleeve 58 in contiguity and the respective directions of eccentricity thereof are preferably caused to extend at angles of 120° from one another as indicated by the axes a—o, b—o and c—o of FIG. 4. The various eccentric disks which are mounted on the two crankshafts by means of the splined sleeve 58 and key 56 are arranged in opposed pairs, which is to say that when each crankshaft has the eccentric disks 60, 62 and 64 thereon, the two disks 60 are disposed in the same vertical plane, while the two disks 62, and the two disks 64, as pairs, are likewise disposed in common planes.

As best seen in FIG. 3, each connecting rod 50, 52 or 54, as the case may be, is in the form of an elongated, relatively thin flat bar having a narrow medial region 72 and enlarged rounded ends 74 in which there are formed respective circular openings 75 providing internal cylindrical bores or bearing surfaces 76 adapted to be telescopically received over the bearing surfaces 66 provided on the various eccentric disks 60, 62 and 64. The bearing surfaces 76 of the connecting rods 50, 52 and 54 are adapted to operatively register with the bearing 66 of the disks 60, 62 and 64 respectively when the connecting rods are all operatively assembled on the crankshafts 30 and 32. When thus assembled, the three connecting rods assume positions of contiguity.

A power take-off pulley 80 is received over the threaded end of each crankshaft 30 and 32 and is provided with a keyway 82 designed for cooperation with the key 56 to prevent relative turning movement of the pulley on its respective crankshaft. An elongated clamping nut 84 maintains each flywheel 55 firmly clamped against the outermost cam disk 64 in the series of such eccentric disks while the inside face of the pulley 80 bears against the outside face of the outermost connecting link 54 and, in combination with the outside face of the flywheel 55, confines the series of three connecting links 50, 52 and 54 therebetween without binding so that these links may be free to move bodily in their respective orbits in a manner that will become clear presently.

Referring now to FIG. 3, it will be seen that with the various above-described coupling parts in their assembled relationship, the axes of eccentricity a—o of the two eccentric disks 60 extend in the same radial direction and in parallelism. Likewise the axes b—o and c—o extend in the same direction and in parallelism. Therefore the center-to-center distance between the eccentric disks of each pair is exactly equal to the center-to-center distance between the openings 75 provided in each connecting link. Thus, in the assembly of the various coupling instrumentalities on the two shafts 30 and 32, no care need be taken in the selection of connecting links nor in the selection of eccentric disks for sequential installation of these parts on the shafts since the various parts are interchangeable. Preferably, during installation of the parts, the flywheels 55 are first installed on the crankshafts 30 and 32 respectively, so that the flanges 57 thereof are telescopically received over the rim of the flange 42 on the adjacent bearing support 40, thus conserving an appreciable amount of space. The pairs of eccentric disks 60, 62 and 64 are then installed within their respective openings 75 at the ends of the connecting links 50, 52 and 54 respectively and the splined sleeves 38 are applied and keyed to the crankshafts 30 and 32 respectively. Thereafter, by properly orienting the eccentric disks within the openings 75 at the ends of the connecting links, utilizing reference indicia 90 which are inscribed on the surface of the eccentric disks, the cam disks with the connecting links assembled thereover, may be slid into position successively in pairs over the two splined sleeves 58 and the pulleys 80 in position on the ends of the crankshafts, after which the clamping nuts 84 may be applied to the threaded ends 48 of the crankshafts 30 and 32 and finally tightened to maintain the various coupling parts in their operative assembled relationship.

In order to lubricate the cooperating cylindrical, opposed bearing surfaces 66 and 76 of the assembled parts, each connecting link is formed with a small transverse hole 92 therethrough in the body portion of the link a slight distance inwardly of each opening 75 and preferably on the longitudinal axis of the link. The holes 92 communicate with upwardly inclined bores 94 through which a suitable lubricant such as machine oil or a viscous machine grease may be introduced into the spaces defined by the holes 92. Longitudinally extending bores 96 establish communication between the various holes 92 and the adjacent openings 75 for conducting the lubricant to the bearing surfaces 66 and 76.

When the various parts of the coupling assembly are installed upon the two crankshafts 30 and 32, it will be seen that the two holes 92 provided in the central connecting link 52 will, at least in part, register with the adjacent holes provided in the next adjacent two connecting links 50 and 54 with such registry being maintained in varying degrees as the three connecting rods bodily move in their respective circular orbits. At no time do the three adjacent holes move out of register with one another so that, considered collectively, the three adjacent holes at each end region of each connecting link, constitute in effect a lubricant reservoir for retaining a quantity of the lubricant. Not only does the lubricant contained within the various reservoirs formed by the registering series of holes serve to effect lubrication of the adjacent bearing surfaces 66 and 76, but a portion of this oil will be applied to the lateral contiguous sliding side faces of the various connecting links to alleviate any frictional drag which otherwise would be present between these surfaces. The side surfaces of the pulleys 80 and the flywheels 55 serve effectively to close the opposite open ends of the lubricant reservoirs created by the existence of the registering holes 92.

Where the coupling device of the present invention is employed in connection with the coupling of two crankshafts such as the crankshafts 30 and 32 illustrated herein, the 120° angles of divergence of the directions of eccentricity of the eccentric disks will ordinarily be maintained and, during initial installation of these cam disks on the splined sleeves 58, care should be taken to avoid the presence of dual dead center conditions in the moving parts of the engine system. In other words, if, when the two engine pistons are in either of their extreme positions wherein they are widely separated or in close proximity to each other, the direction of eccentricity of none of the eccentric disks extends horizontally in the common plane of the crankshafts 30 and 32, such dual dead center conditions will be avoided. Preferably, to afford the application of maximum torque between the two crankshafts, at the time the pistons are in extreme positions wherein they are adjacent each other, the direction of eccentricity of one of the pairs of eccentric disks will extend vertically.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claim is the same to be limited.

Having thus described the invention what I claim as new and desire to secure by Letters Patent is:

Coupling apparatus for synchronizing the rotary movements of spaced parallel shafts, said apparatus comprising a plurality of thin circular eccentric disks arranged in face-to-face contiguity and fixedly and eccentrically mounted on each shaft, said eccentric disks being disposed on the two shafts in pairs with the disks of each pair being disposed in a common plane, the directions of eccentricity of the disks of each pair extending in parallelity, the amplitudes of eccentricity of the disks of each pair being equal, each eccentric disk presenting a cylindrical peripheral surface, the diameters of the cylindrical surfaces of the disks of each pair being equal, the directions of eccentricity of the eccentric disks of each adjacent pair on each shaft diverging at fixed angles from each other, a flat-sided connecting link operatively connecting the disks of each pair for constraining said eccentric disks and their respective shafts to rotate in unison, the opposed flat sides of adjacent links making sliding face-to-face contact with each other, each connecting link being formed with transversely extending bearing openings in the opposite end regions thereof, each opening presenting an internal cylindrical bearing surface within which surfaces the respective eccentric disks of one of the pair of disks are rotatably journalled, each connecting link being formed with a pair of transversely extending holes therethrough adjacent the bearing openings respectively, the corresponding openings of adjacent connecting links being in constant sealing registry with each other and defining pairs of lubricant reservoirs, and a pair of closure members on opposite sides of the contiguous connecting links in registry with the transverse holes in the outermost connecting links for closing the ends of the reservoirs.

References Cited in the file of this patent

UNITED STATES PATENTS

| | | |
|---|---|---|
| 1,300,531 | Weis | Apr. 15, 1919 |
| 2,155,455 | Thoma | Apr. 25, 1939 |
| 2,274,877 | Wagnespack | Mar. 3, 1942 |
| 2,779,321 | Roder | Jan. 29, 1957 |